(12) United States Patent
Frink

(10) Patent No.: US 10,243,861 B1
(45) Date of Patent: Mar. 26, 2019

(54) REDUCING JITTER AND COMPENSATING FOR MEMORY LATENCY DURING TRAFFIC SHAPING

(71) Applicant: Juniper Networks, Inc., Sunnyvale, CA (US)

(72) Inventor: Craig R. Frink, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 201 days.

(21) Appl. No.: 15/439,378

(22) Filed: Feb. 22, 2017

(51) Int. Cl.
*H04L 12/24* (2006.01)
*H04L 12/26* (2006.01)
*H04L 12/815* (2013.01)
*H04L 12/841* (2013.01)
*H04L 12/873* (2013.01)

(52) U.S. Cl.
CPC ........ *H04L 47/225* (2013.01); *H04L 41/0896* (2013.01); *H04L 43/106* (2013.01); *H04L 47/283* (2013.01); *H04L 47/52* (2013.01)

(58) Field of Classification Search
None
See application file for complete search history.

(56) References Cited

U.S. PATENT DOCUMENTS

| | | | |
|---|---|---|---|
| 8,051,136 B2 * | 11/2011 | Dingler | H04L 65/1016 709/206 |
| 9,166,918 B1 * | 10/2015 | Frink | H04L 47/25 |
| 2010/0278190 A1 * | 11/2010 | Yip | H04L 47/60 370/412 |
| 2017/0208120 A1 * | 7/2017 | Drobychev | G06F 9/5011 |

* cited by examiner

*Primary Examiner* — Jutai Kao
(74) *Attorney, Agent, or Firm* — Harrity & Harrity, LLP (57) ABSTRACT

A first device may receive an indication that a time interval has elapsed. The time interval may indicate a time at which the first device is to provide a rate credit update to a second device. The first device may generate a request for a set of instructions. The first device may provide the request to a third device that may store the set of instructions. The first device may store information associated with the request, and a timestamp of the request, in a first data structure. The first device may receive, from the third device, the set of instructions. The first device may store the set of instructions and the timestamp in a second data structure. The first device may determine whether a threshold amount of time after the time indicated by the timestamp has elapsed. The first device may provide the rate credit update to the second device.

20 Claims, 4 Drawing Sheets

REDUCING JITTER AND COMPENSATING FOR MEMORY LATENCY DURING TRAFFIC SHAPING

BACKGROUND

Traffic shaping (also known as packet shaping) may include a computer network traffic management technique which delays some or all datagrams to bring them into compliance with a desired traffic profile. Traffic shaping may be used to optimize or guarantee performance, improve latency, and/or increase usable bandwidth for some kinds of packets by delaying other kinds.

SUMMARY

According to some possible implementations, a first device may include one or more processors to receive an indication that a time interval has elapsed. The time interval may indicate a time at which the first device is to provide a rate credit update to a second device. The one or more processors may generate a request for a set of instructions based on receiving the indication. The set of instructions may be associated with the rate credit update. The one or more processors may provide the request to a third device based on generating the request. The third device may store the set of instructions. The one or more processors may store information associated with the request, and a timestamp of the request, in a first data structure in association with providing the request to the third device. The one or more processors may receive, from the third device, the set of instructions based on storing the information associated with the request. The one or more processors may store the set of instructions and the timestamp in a second data structure based on receiving the set of instructions. The one or more processors may determine whether a threshold amount of time after the time indicated by the timestamp has elapsed based on storing the set of instructions and the timestamp. The one or more processors may provide the rate credit update to the second device based on determining whether the threshold amount of time after the time indicated by the timestamp has elapsed.

According to some possible implementations, a non-transitory computer-readable medium may store one or more instructions that, when executed by one or more processors of a network device, cause the one or more processors to receive a first indication that a time interval has elapsed. The time interval may indicate a time associated with requesting a set of instructions from an external storage device. The external storage device may be external to the network device. The one or more instructions, when executed by the one or more processors of the network device, may cause the one or more processors to generate a request for the set of instructions based on receiving the first indication. The set of instructions may be associated with a rate credit update to be provided to another device. The other device may be different than the network device or the external storage device. The one or more instructions, when executed by the one or more processors of the network device, may cause the one or more processors to provide the request to the external storage device based on generating the request. The external storage device may store the set of instructions. The one or more instructions, when executed by the one or more processors of the network device, may cause the one or more processors to store information associated with the request, and a timestamp of the request, in association with providing the request to the external storage device. The one or more instructions, when executed by the one or more processors of the network device, may cause the one or more processors to receive, from the external storage device, a second indication that the external storage device successfully located the set of instructions after storing the information. The one or more instructions, when executed by the one or more processors of the network device, may cause the one or more processors to receive, from the external storage device, the set of instructions after receiving the second indication. The one or more instructions, when executed by the one or more processors of the network device, may cause the one or more processors to store the set of instructions in association with the timestamp based on receiving the set of instructions. The one or more instructions, when executed by the one or more processors of the network device, may cause the one or more processors to determine whether a threshold amount of time after the time indicated by the timestamp has elapsed based on storing the set of instructions. The one or more instructions, when executed by the one or more processors of the network device, may cause the one or more processors to provide the rate credit update to the other device based on determining whether the threshold amount of time after the time indicated by the timestamp has elapsed.

According to some possible implementations, a method may include receiving, by a first device, one or more indications that one or more time intervals have elapsed. The one or more time intervals may indicate one or more times at which the first device is to request one or more sets of instructions from one or more second devices. The one or more sets of instructions may indicate an amount of rate credits to be provided to one or more third devices during one or more rate credit updates associated with the one or more third devices. The method may include generating, by the first device, one or more requests for the one or more sets of instructions based on receiving the one or more indications. The one or more requests may include use of direct memory access (DMA). The method may include providing, by the first device, the one or more requests to the one or more second devices based on generating the one or more requests. The one or more second devices may store the one or more sets of instructions.

The method may include storing, by the first device, information associated with the one or more requests, and one or more timestamps of the one or more requests, in association with providing the one or more requests to the one or more second devices. The method may include receiving, by the first device and from the one or more second devices, the one or more sets of instructions based on storing the information associated with the one or more requests. The method may include storing, by the first device, the one or more sets of instructions in association with the one or more timestamps based on receiving the one or more sets of instructions. The method may include determining, by the first device, whether one or more threshold amounts of time after the one or more times indicated by the one or more timestamps have elapsed based on storing the one or more sets of instructions. The method may include providing, by the first device, the one or more rate credit updates to the one or more third devices based on determining whether the one or more threshold amounts of time after the one or more times indicated by the one or more timestamps have elapsed.

DETAILED DESCRIPTION

The following detailed description of example implementations refers to the accompanying drawings. The same reference numbers in different drawings may identify the same or similar elements.

A network device (e.g., a traffic shaper) may be used to control a transmission rate of data of another device in a scheduling system. The network device may shape the transmission rate by providing rate credits to the other device in the form of a rate credit update. The network device may determine an amount of rate credits to provide to the other device using a set of instructions. In some cases, the network device may have to use thousands or millions of sets of instructions depending on the quantity of other devices for which the network device controls the transmission rate.

Storing thousands or millions of sets of instructions, however, may consume significant memory resources of the network device and, in some cases, may exceed the memory resources of the network device. For this reason, the sets of instructions may be stored on an external storage device, which the network device can access. Accessing the sets of instructions on an external storage device, however, may introduce latency with regard to determining an amount of rate credits to provide to another device, thereby delaying and/or disrupting the transmission rate of the other device. In addition, accessing the sets of instructions on the external storage device may result in jitter or other performance issues.

Implementations described herein enable a network device to use a configurable delay when updating rate credits for another device by determining a timestamp for each rate credit update and delaying the rate credit update by a threshold amount of time that exceeds a latency variation for an external storage device storing a set of instructions related to the rate credit update. This permits the network device to update rate credits at a regular interval regardless of latency associated with the external storage device (e.g., due to the network device delaying updates by an amount of time that exceeds the latency variation for the external storage device).

In this way, the network device reduces or eliminates an effect of latency when obtaining a set of instructions related to a rate credit update from an external storage device, thereby improving rate credit updates. Furthermore, in this way, the network device improves performance of the other device by reducing or eliminating jitter of the other device due to latency related to obtaining a set of instructions for a rate credit update from an external storage device. Furthermore, in this way, the network device improves a transmission of data by the other device by reducing or eliminating clipping (e.g., loss of rate credits when previously updated rate credits are unused and exceed a clip size for the other device), and maximizes a transmission capability of the other device, thereby improving a transmission of data and/or reducing idle time of the other device.

Figure 1:
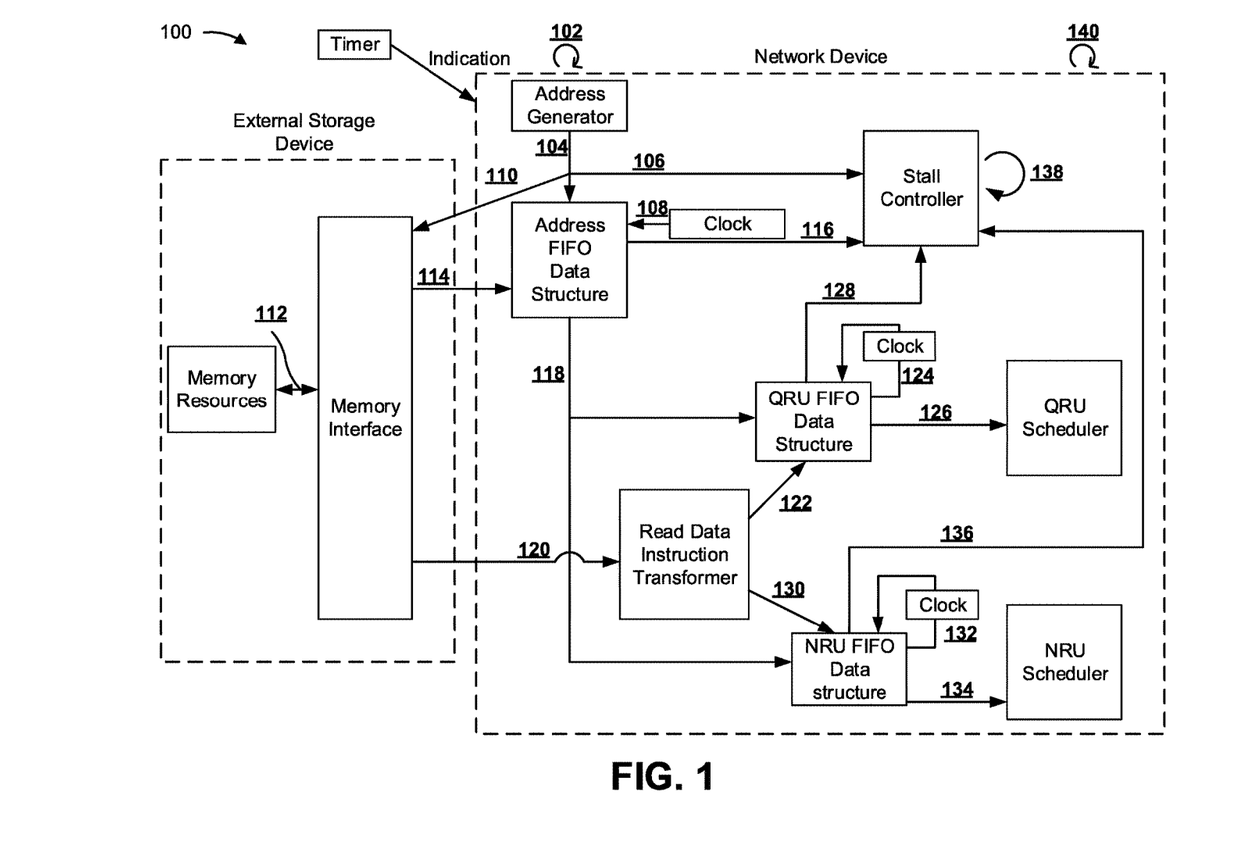
FIG. 1 is a diagram of an overview of an example implementation described herein.

FIG. 1 is a diagram of an overview of an example implementation 100 described herein. As shown in FIG. 1, example implementation 100 includes a network device having an address generator, an address first in first out (FIFO) data structure, and a clock. The network device may further includes a read data instruction transformer, a queue rate update (QRU) FIFO data structure and QRU scheduler, a node rate update (NRU) FIFO data structure and NRU scheduler, and a stall controller. Example implementation 100 further includes an external storage device having memory resources and a memory interface.

As shown in FIG. 1, and by reference number 102, the network device may determine to obtain a set of instructions from an external storage device. For example, the network device may determine to obtain a set of instructions based on a timer (e.g., based on receiving an indication from a timer that a time interval has elapsed), based on input from a user of a client device (not shown), according to a schedule, and/or the like.

As shown by reference number 104, the network device may cause an address generator to generate a request for the set of instructions. For example, the request may include a uniform resource identifier (URI) for the set of instructions, or other information that identifies a storage location for the set of instructions. As further shown, the network device may store information identifying the request in an address FIFO data structure. In some implementations, the request may include a QRU for a rate credit update for a queue (e.g., a transmission queue of a device). Additionally, or alternatively, the request may include an NRU for a rate credit update for a node (e.g., a device with one or more transmission queues).

As shown by reference number 106, the network device may provide information identifying the request to a stall controller. For example, the stall controller may monitor outstanding requests (e.g., a quantity of outstanding requests, a type of the outstanding requests, etc.).

As shown by reference number 108, the network device may record a timestamp for the request using a clock. For example, the timestamp may permit the network device to determine a time at which the request was generated. As shown by reference number 110, the network device may provide the request to a memory interface of an external storage device. For example, the network device may provide the request to the memory interface to obtain the set of instructions. As shown by reference number 112, the external storage device may obtain the set of instructions from the memory resources of the external storage device based on the request.

As shown by reference number 114, the external storage device may provide information indicating that the external storage device successfully located the set of instructions in the memory resources. As a result, the network device may remove the information for the request from the address FIFO data structure.

As shown by reference number 116, the network device may provide an indication to the stall controller that the set of instructions was successfully located on the external storage device and/or may provide information identifying entries remaining in the address FIFO data structure. For example, the stall controller may remove information for the request from a list of pending requests and/or reconcile a record of outstanding requests with the information identifying the entries remaining in the address FIFO data structure.

As shown by reference number 118, the network device may provide the timestamp for the request to a QRU FIFO data structure for QRUs. Additionally, or alternatively, as shown by reference number 118, the network device may provide the timestamp for the request to an NRU FIFO data structure for NRUs.

As shown by reference number 120, the network device may receive the set of instructions from the external storage device (e.g., via the memory interface) and may provide the set of instructions to a read data instruction transformer. For example, the read data instruction transformer may decode the set of instructions received from the external storage device so that the network device can process the set of instructions.

As shown by reference number 122, the network device may provide the set of instructions to the QRU FIFO data structure, when the set of instructions is for a QRU. For example, the network device may provide the set of instructions to the QRU FIFO data structure after the read data instruction transformer decodes the set of instructions. In some implementations, the network device may provide the set of instructions to the QRU FIFO data structure to store the set of instructions while the network device processes the set of instructions and determines whether to provide the QRU to the device with which the QRU is associated.

As shown by reference number 124, the network device may use the QRU FIFO data structure to determine whether a threshold amount of time since generating the request has elapsed and/or whether the current time, as indicated by a clock, satisfies a threshold time (e.g., is greater than or equal to the threshold time). For example, the threshold time may be determined using the timestamp for the set of instructions, plus a pre-configured delay (e.g., based on a latency variation of obtaining the set of instructions from the external storage device), plus any configured rate limit.

The network device may wait to provide the QRU to another device until the current time satisfies the threshold time and/or the threshold amount of time has elapsed. In this way, the network device may reduce or eliminate an effect of latency of obtaining the set of instructions from the external storage device by waiting to provide information related to a QRU until the current time satisfies a threshold time that accounts for latency variation of the external storage device. This enables the network device to provide the QRU to the other device at a regular interval, regardless of latency variations of obtaining the set of instructions from the external storage device.

As shown by reference number 126, if the network device determines that the threshold time is satisfied, the network device may remove information associated with the set of instructions from the QRU FIFO data structure, and may provide the QRU (e.g., information identifying the amount of rate credits indicated by the set of instructions) to a QRU scheduler (e.g., via a QRU interface). For example, the QRU scheduler may schedule transmission of the QRU to another device.

As shown by reference number 128, the network device may provide information to the stall controller that the QRU has been scheduled for transmission. For example, the network device may provide the information to permit the stall controller to determine whether to delay the transmission of the QRU.

As shown by reference number 130, the network device may provide the set of instructions to the NRU FIFO data structure, when the set of instructions is for an NRU. For example, the network device may provide the set of instructions to the NRU FIFO data structure after the read data instruction transformer decodes the set of instructions.

As shown by reference number 132, the network device may use the NRU FIFO data structure to determine whether a threshold amount of time since generating the request has elapsed and/or whether the current time, as indicated by a clock, satisfies a threshold time (e.g., is greater than or equal to the threshold time), in a manner similar to that described above with respect to reference number 124.

As shown by reference number 134, if the network device determines that the threshold time is satisfied, the network device may remove information associated with the set of instructions from the NRU FIFO data structure, and may provide the NRU (e.g., information identifying the amount of rate credits indicated by the set of instructions) to an NRU scheduler (e.g., via a an NRU interface). For example, the NRU scheduler may schedule transmission of the NRU to another device.

As shown by reference number 136, the network device may provide information to the stall controller that the NRU has been scheduled for transmission. For example, the network device may provide the information to permit the stall controller to determine whether to delay the transmission of the NRU.

As shown by reference number 138, the stall controller may determine whether to delay transmission of the QRU and/or the NRU to another device. For example, the stall controller may delay transmission when the network device has maximized transmission capacity. As shown by reference number 140, the network device may provide the QRU and/or the NRU to another device to update rate credits for the other device (e.g., after any delay determined by the stall controller).

In this way, the network device reduces or eliminates an effect of latency when obtaining a set of instructions related to a rate credit update from an external storage device. Furthermore, in this way, the network device improves performance of the other device by reducing or eliminating jitter of the other device due to latency related to obtaining a set of instructions for a rate credit update from an external storage device. Furthermore, in this way, the network device improves a transmission of data by the other device by reducing or eliminating clipping, and maximizes a transmission capability of the other device, thereby improving a transmission of data and/or reducing idle time of the other device.

As indicated above, FIG. 1 is provided merely as an example. Other examples are possible and may differ from what was described with regard to FIG. 1. For example, other implementations may include different elements than shown in FIG. 1 (e.g., elements different than an address FIFO data structure, a read data instruction transformer, a QRU FIFO data structure, an NRU FIFO data structure, a QRU Scheduler, an NRU scheduler, or a stall controller). In addition, in other implementations, one or more elements shown in FIG. 1 may be combined into a single element, or a single element shown in FIG. 1 may be implemented as multiple elements.

Figure 2:
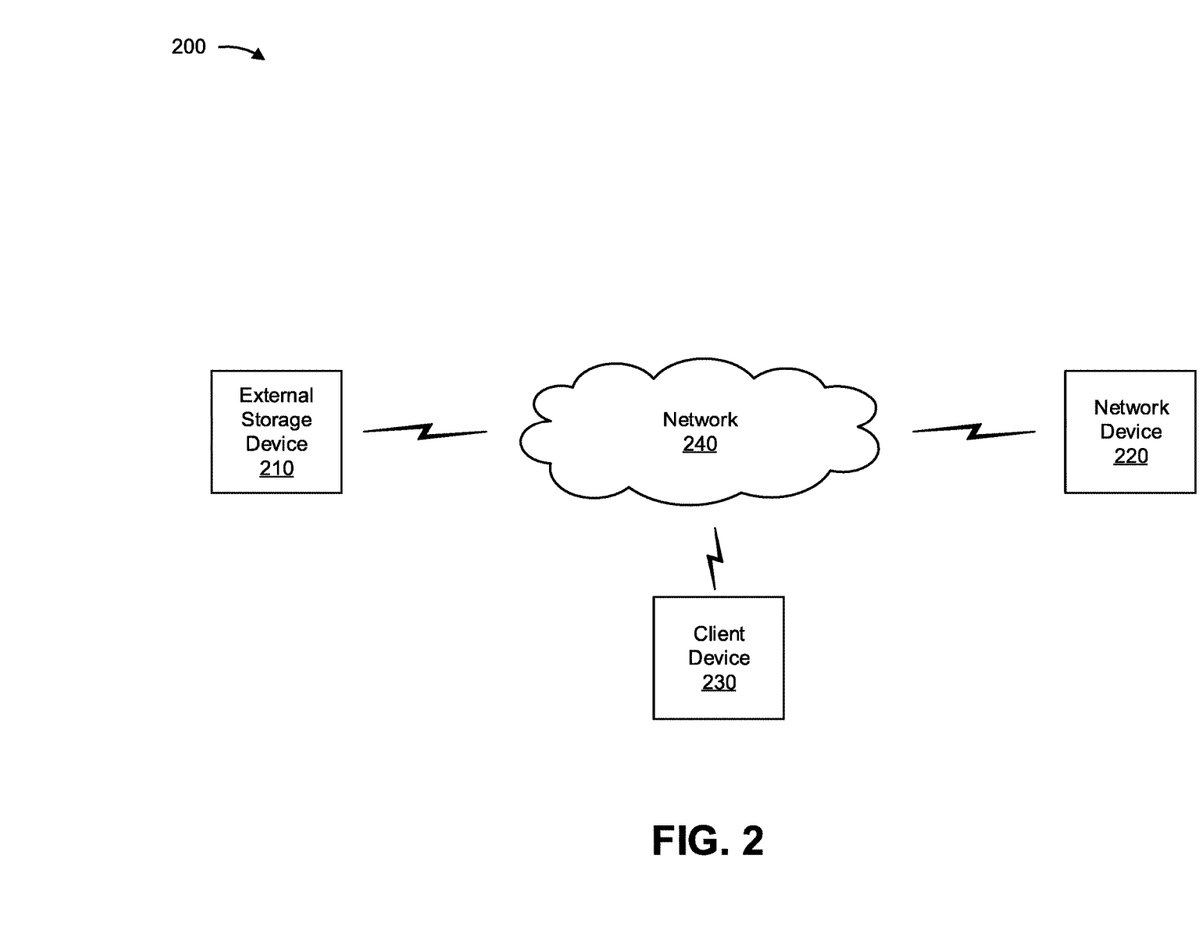
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include external storage device 210, network device 220, client device 230, and network 240. Devices of environment 200 may interconnect via wired connections, wireless connections, or a combination of wired and wireless connections.

External storage device 210 includes one or more devices capable of receiving, providing, storing, generating, and/or processing information associated with a set of instructions for a rate credit update for a device. For example, external storage device 210 may include a server (e.g., in a data center or a cloud computing environment), a data center (e.g., a multi-server micro data center), a workstation computer, a virtual machine (VM) provided in a cloud computing environment, or a similar type of device. In some implementations, external storage device 210 may receive, from network device 220, a request for a set of instructions related to a rate credit update for a device, as described elsewhere herein. Additionally, or alternatively, external storage device 210 may provide the set of instructions to network device 220, as described elsewhere herein.

Network device 220 includes one or more devices (e.g., one or more traffic transfer devices) capable of receiving, generating, storing, processing, and/or providing information associated with a set of instructions for a rate credit update for another device. For example, network device 220 may include a traffic shaper, a firewall, a router, a gateway, a switch, a hub, a bridge, a reverse proxy, a server (e.g., a proxy server), a security device, an intrusion detection device, a load balancer, or a similar device. In some implementations, network device 220 may provide a request to external storage device 210 to obtain a set of instructions for a rate credit update, as described elsewhere herein. Additionally, or alternatively, network device 20 may receive the set of instructions from external storage device 210 and may process the set of instructions, as described elsewhere herein.

Client device 230 includes one or more devices capable of receiving, generating, storing, processing, and/or providing information associated with a set of instructions for a rate credit update for another device. For example, client device 230 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, client device 230 may receive information associated with the set of instructions from network device 220, as described elsewhere herein. Additionally, or alternatively, client device 230 may provide the information for display, as described elsewhere herein.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
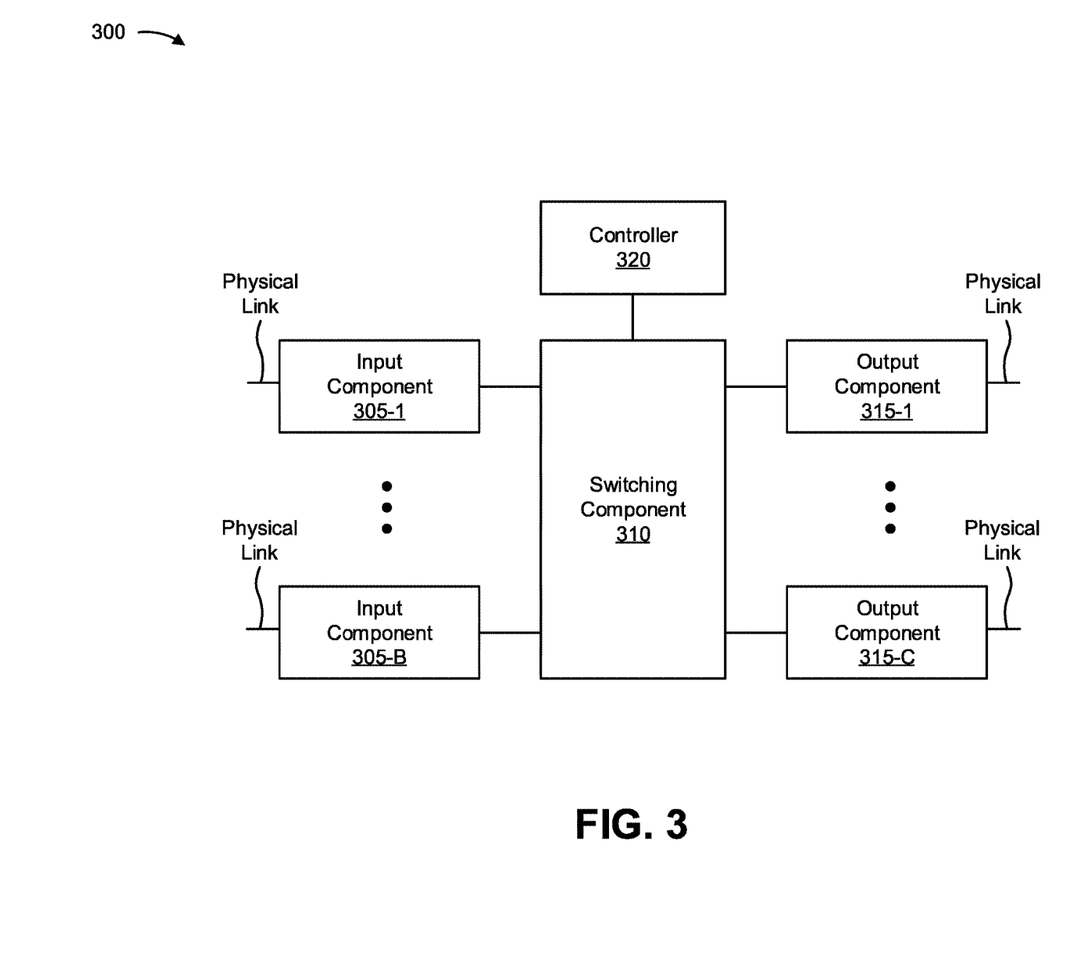
FIG. 3 is a diagram of example components of one or more devices of FIG. 2.

FIG. 3 is a diagram of example components of a device 300. Device 300 may correspond to external storage device 210, network device 220, and/or client device 230. In some implementations, network device 220 and/or client device 230 may include one or more devices 300 and/or one or more components of device 300. As shown in FIG. 3, device 300 may include one or more input components 305-1 through 305-B (B>1) (hereinafter referred to collectively as input components 305, and individually as input component 305), a switching component 310, one or more output components 315-1 through 315-C (C>1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
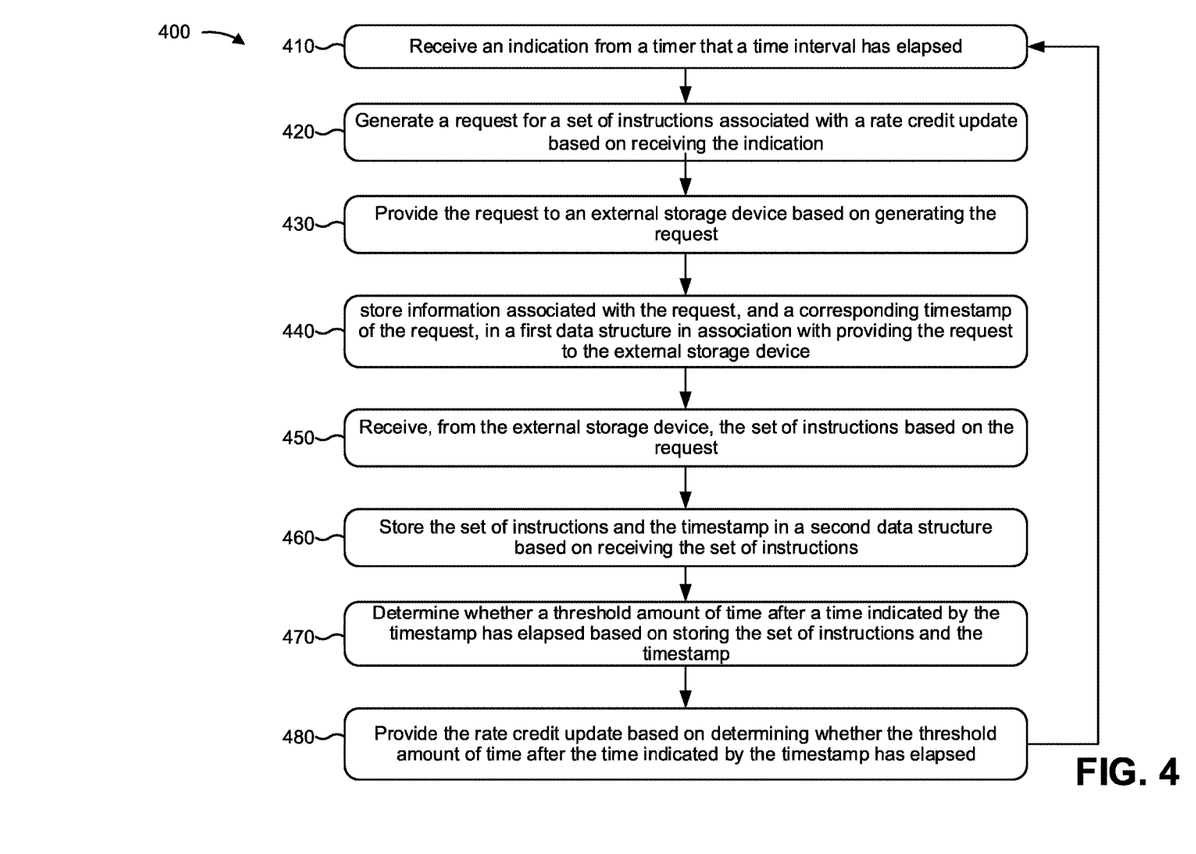
FIG. 4 is a flow chart of an example process for reducing jitter and compensating for memory latency during traffic shaping.

FIG. 4 is a flow chart of an example process 400 for reducing jitter and compensating for memory latency during traffic shaping. In some implementations, one or more process blocks of FIG. 4 may be performed by network device 220. In some implementations, one or more process blocks of FIG. 4 may be performed by another device or a group of devices separate from or including network device 220, such as external storage device 210 and/or client device 230.

As shown in FIG. 4, process 400 may include receiving an indication from a timer that a time interval has elapsed (block 410). For example, network device 220 may receive the indication that a time interval has elapsed. In some implementations, network device 220 may receive the indication when a timer indicates that a time interval has elapsed.

In some implementations, the timer may measure a time interval of a particular length (e.g., measured in terms of minutes, seconds, milliseconds, etc.). In some implementations, the time interval may be periodic, based on a schedule, configured by a user of client device 230, and/or the like. In some implementations, the timer may be correlated with a transmission rate and/or transmission capacity of another device. For example, assume that another device has capacity to transmit a particular amount of data every 10 milliseconds. In this case, the timer may be set to record 10 millisecond intervals.

In some implementations, network device 220 may perform an action based on the timer. For example, network device 220 may perform an action each time the timer measures a particular amount of time. In some implementations, network device 220 may generate a request for a set of instructions associated with a rate credit update (as described below) based on the timer. In this way, network device 220 may periodically, or according to a schedule, generate a request for a set of instructions for a rate credit update, thereby improving generation of the request.

In this way, network device 220 may receive an indication from a timer that a time interval has elapsed.

As further shown in FIG. 4, process 400 may include generating a request for a set of instructions associated with a rate credit update based on receiving the indication (block 420). For example, network device 220 may generate the request based on receiving the indication. In some implementations, network device 220 may use an address generator of network device 220 to generate the request. In some implementations, the set of instructions may be associated with a rate credit update. For example, the set of instructions may identify an amount of rate credits to provide to another device for a rate credit update. Continuing with the previous example, assuming that the other device can transmit 10 kilobytes (KB) of data every second, the set of instructions may include information indicating that the other device is to receive 10 KB of rate credits every second.

In some implementations, the request may include information identifying a storage location of a set of instructions for a rate credit update. For example, the request may include a URI, such as a uniform resource name (URN) or a uniform resource locator (URL). In some implementations, the request may include use of direct memory access (DMA). Additionally, or alternatively, the request may include a high bandwidth memory (HBM) request.

In some implementations, the request may include a queue rate update (QRU) request, where the QRU identifies a rate credit update for a queue. For example, a queue may refer to a transmission queue of a device. In some implementations, a single device may have one or more queues. Additionally, or alternatively, the request may include a node rate update (NRU) request, where the NRU identifies a rate credit update for a node. For example, a node may refer to a device (e.g., that has one or more queues). In this way, the request may be associated with various types of rate credit updates.

In some implementations, a rate credit update may include information identifying an amount of data (e.g., bytes) that a device is permitted to transmit during a particular time period. For example, the rate credit update may indicate that a device is permitted to transmit 10 bytes of data every 10 milliseconds. As a particular example, when the device sends one byte of data, the device may use one byte of rate credit. In this case, the device may transmit data until rate credits provided to the device are exhausted, and may wait for additional rate credits before transmitting additional data.

In some implementations, the rate credit update may be based on a transmission capability of a device to which the rate credit update is to be provided, network resources (e.g., bandwidth) available to the device to which the rate credit is to be provided, information provided by a user of client device 230, and/or the like. In some implementations, network device 220 may provide the rate credit update to the device according to a time interval (e.g., as indicated by a timer), as described elsewhere herein. In some implementations, the set of instructions may include information identifying the rate credit update to be provided to a device. For example, the set of instructions may include information identifying an amount of data that a device is permitted to transmit during a time interval.

In this way, network device 220 may generate a request for a set of instructions associated with a rate credit update based on receiving an indication from a timer.

As further shown in FIG. 4, process 400 may include providing the request to an external storage device based on generating the request (block 430). For example, network device 220 may provide the request to external storage device 210. In some implementations, network device 220 may provide the request based on generating the request. In some implementations, network device 220 may provide the request to a memory interface of external storage device 210. For example, network device 220 may provide the request via the memory interface to permit external storage device 210 to process the request and obtain the requested set of instructions from memory resources of external storage device 210. In some implementations, network device 220 may automatically provide the request when network device 220 generates the request, based on input from a user of client device 230, after waiting a threshold amount of time, and/or the like.

In this way, network device 220 may provide a request for a set of instructions associated with a rate credit update to external storage device 210 based on generating the request.

As further shown in FIG. 4, process 400 may include storing information associated with the request, and a corresponding timestamp of the request, in a first data structure in association with providing the request to the external storage device (block 440). For example, network device 220 may store information identifying the request, and a corresponding timestamp, in a first data structure (e.g., an address FIFO data structure). In some implementations, network device 220 may store the information identifying the request in association with providing the request to external storage device 210.

In some implementations, the timestamp may include information that indicates a particular time. In some implementations, the timestamp may be associated with the request (e.g., a time at which the request was generated, provided to external storage device 210, etc.). In some implementations, network device 220 may determine the timestamp using a clock of network device 220 that indicates a current time. In this way, network device 220 may record a timestamp associated with the request.

In some implementations, the information associated with the request may include information identifying the set of instructions being requested (e.g., an identifier for the set of instructions). Additionally, or alternatively, the information associated with the request may include information that uniquely identifies the request (e.g., a request identifier). Additionally, or alternatively, the information associated with the request may include information that identifies a device with which the set of instructions is associated. For example, the information associated with the request may identify a device to which the rate credit update identified by the set of instructions is to be provided. Additionally, or alternatively, the information associated with the set of instructions may include information identifying a storage location of the request.

In this way, network device 220 may store information associated with a request, and a corresponding timestamp of the request, in a first data structure.

As further shown in FIG. 4, process 400 may include receiving, from the external storage device, the set of instructions based on the request (block 450). For example, network device 220 may receive a set of instructions related to a rate credit update (e.g., via network 240). In some implementations, network device 220 may receive the set of instructions from external storage device 210 (e.g., via a memory interface of external storage device 210).

In some implementations, network device 220 may receive an indication that external storage device 210 successfully located the set of instructions using the request (e.g., prior to receiving the set of instructions). In some implementations, network device 220 may remove information associated with the request from the first data structure based on receiving the indication that external storage device 210 successfully located the set of instructions in memory resources of external storage device 210. This conserves memory resources of network device 220 and permits network device 220 to quickly, efficiently, and accurately identify pending requests, thereby conserving processing resources.

In some implementations, network device 220 may decode the set of instructions when network device 220 receives the set of instructions. For example, network device 220 may parse the set of instructions, decode the set of instructions, such as from base64 or another encoding scheme, decrypt the set of instructions, and/or the like. In some implementations, network device 220 may use a data transformer (e.g., a read data instruction transformer) to decode the set of instructions. In this way, network device 220 may decode the set of instructions received from external storage device 210.

In some implementations, network device 220 may receive the set of instructions based on external storage device 210 providing the set of instructions. In some implementations, external storage device 210 may have used information included in the request (e.g., received via a memory interface of external storage device 210) to locate the set of instructions in memory resources of external storage device 210.

In some implementations, network device 220 may provide an indication to a stall controller of network device 220 that the set of instructions was successfully located on external storage device 210 and/or may provide, to the stall controller, information identifying entries remaining in the first data structure (e.g., corresponding to pending requests for set of instructions). For example, the stall controller may remove information for the request from a list of pending requests based on receiving the indication from network device 220. As another example, the stall controller may reconcile a record of pending requests stored by the stall controller and the information identifying the entries remaining in the data structure. In this way, network device 220 may cause the stall controller to store accurate information associated with pending requests. This conserves memory resources of network device 220 and/or conserves processing resources associated with identifying pending requests.

In some implementations, a stall controller may include an element of network device 220 that determines an amount of time network device 220 is to stall, or delay, execution of instructions, or performance of an action. For example, a stall controller may introduce a bubble or pipeline stall into execution of an instruction in an instruction pipeline to delay the execution of the instruction, such as to resolve a hazard related to the execution.

In this way, network device 220 may receive the set of instructions from external storage device 210.

As further shown in FIG. 4, process 400 may include storing the set of instructions and the timestamp in a second data structure based on receiving the set of instructions (block 460). For example, network device 220 may store the set of instructions and the timestamp in a second data structure. In some implementations, network device 220 may store the set of instructions and the timestamp based on receiving the set of instructions.

In some implementations, the timestamp may be the same timestamp as described above. For example, the timestamp may indicate a time at which network device 220 received an indication from a timer, a time at which network device 220 generated a request for a set of instructions, a time at which network device 220 provided the request to external storage device 210, and/or the like.

In some implementations, the second data structure may include a QRU FIFO data structure for QRUs. Additionally, or alternatively, the second data structure may include an NRU FIFO data structure for NRUs. In some implementations, a FIFO data structure may refer to a type of data structure where data is removed from the data structure in an order in which the data was stored in the data structure. In some implementations, the second data structure may include a data structure other than a FIFO data structure, such as a last in first out (LIFO) data structure (e.g., where the last data stored in the data structure is the first data to be removed from the data structure), or a data structure that is different than a FIFO data structure or a LIFO data structure. In some implementations, the second data structure and the first data structure may be the same data structure. In some implementations, network device 220 may store the set of instructions and the timestamp in the second data structure while network device 220 processes the set of instructions to determine the rate credit update for a device, determines whether to provide the rate credit update to the device, and/or the like.

In this way, network device 220 may store the set of instructions and the timestamp in a second data structure.

As further shown in FIG. 4, process 400 may include determining whether a threshold amount of time after a time indicated by the timestamp has elapsed based on storing the set of instructions and the timestamp (block 470). For example, network device 220 may determine whether the threshold amount of time has elapsed. In some implementations, network device 220 may determine whether the threshold amount of time has elapsed after storing the set of instructions and the timestamp. Additionally, or alternatively, network device 220 may determine whether a current time (e.g., as indicated by a clock) satisfies a threshold time.

In some implementations, network device 220 may determine whether the threshold amount of time has elapsed by performing a comparison. In some implementations, network device 220 may perform a comparison of the timestamp plus a delay value, and a current time (e.g., as indicated by a clock). For example, assuming the delay value is 5 milliseconds (ms), the timestamp identifies a time of 1:03:53.37 eastern standard time (EST), and a clock indicates a time of 1:03:53.45 EST (e.g., the current time), network device 220 may compare 1:03:53.42 EST (1:03:53.37 EST plus 5 ms) and 1:03:53.45 EST to determine whether the current time satisfies the threshold time (e.g., the timestamp plus the delay value). In this case, network device 220 may determine that the current time satisfies the threshold time and that a threshold amount of time has elapsed since network device 220 generated the request, provided the request to external storage device 210, received the indication from the timer, and/or the like.

In some implementations, network device 220 may provide the information (as described below) when a result of the comparison indicates that the current time satisfies a threshold time, or that a threshold amount of time has elapsed. Conversely, in some implementations, network device 220 may continue to monitor the current time until the threshold amount of time has elapsed (e.g., until the current time is greater than or equal to the timestamp plus a delay value), when network device 220 determines that the threshold amount of time has not elapsed. For example, using the example above, network device 220 may continue to monitor the current time when network device 220 determines that the current time has not reached 1:03:53.42 EST (e.g., is 1:03:53.41 EST, 1:03:53.39 EST, etc.).

In some implementations, a delay value may include a pre-determined value by which network device 220 is to delay providing a rate credit update. For example, network device 220 may use the delay value to compensate for latency variations related to obtaining a set of instructions from external storage device 210. In some implementations, the delay value may be based on a variation of latency associated with obtaining the set of instructions from external storage device 210 (e.g., a variation of latency of memory resources of external storage device 210). In this case, the delay value may be a value that is greater than the variation. For example, if latency variation related to obtaining the set of instructions from external storage device 210 is 3 ms, then the delay value may be set to a value greater than 3 ms. By using a delay value set to greater than the latency variation of external storage device 210, network device 220 may quickly and efficiently eliminate an effect of variable latency of external storage device 210. This permits use of memory resources with variable latency (e.g., compared to memory resources with consistent latency), which may be cheaper and easier to implement.

This causes network device 220 to consistently provide the information at a regular interval by causing network device 220 to wait a consistent amount of time to provide the rate credit update regardless of variations in latency of obtaining the set of instructions from external storage device 210. This reduces or eliminates variations in providing the rate credit update, thereby reducing or eliminating jitter on the device receiving the rate credit update, or other effects of variable latency, thereby conserving processing resources of the other device, improving operations of the other device, and/or the like.

In some implementations, network device 220 may use one or more delay values when determining whether to provide the rate credit update. For example, network device 220 may use a QRU delay value for QRUs and a NRU delay value for NRUs. In this way, network device 220 may dynamically adjust to accommodate multiple types of rate credit updates, thereby improving performance of network device 220.

In some implementations, network device 220 may determine whether a rate limit value is to be applied to a rate credit update (e.g., prior to providing the rate credit update and after determining that the threshold amount of time has elapsed) when determining whether to provide a rate credit update. For example, the rate limit value may cause network device 220 to delay providing the rate credit update to another device by identifying an amount of time network device 220 is to delay providing the rate credit update. In some implementations, the rate limit value may include a default rate limit, a rate limit configured by a user of client device 230, and/or the like. In some implementations, for example, a rate limit value may differ from a delay value described above in that the rate limit value may apply to all rate credit updates, whereas the delay value may apply to a particular rate credit update and may be based on the particular external storage device 210 on which a set of instructions for the rate credit update is stored (e.g., may be based on latency variation for the particular external storage device 210).

In this way, network device 220 may determine whether a threshold amount of time after a time indicated by a timestamp has elapsed after storing a set of instructions and the timestamp.

As further shown in FIG. 4, process 400 may include providing the rate credit update based on determining whether the threshold amount of time after the time indicated by the timestamp has elapsed (block 480). For example, network device 220 may provide the rate credit update. In some implementations, network device 220 may provide the rate credit update based on determining that the threshold amount of time after the time indicated by the time stamp has elapsed.

In some implementations, network device 220 may provide the rate credit update to a scheduler (e.g., a QRU scheduler for QRUs or an NRU scheduler for NRUs). For example, network device 220 may provide the information to the scheduler via an interface (e.g., a QRU interface for QRUs or an NRU interface for NRUs). In some implementations, network device 220 may provide the information to cause the scheduler to schedule transmission of the rate credit to another device (e.g., the device with which the rate credit update is associated). In some implementations, network device 220 may receive an indication from the scheduler that the rate credit update has been scheduled for transmission.

In some implementations, network device 220 may provide information to a stall controller that the scheduler has scheduled the rate credit update for transmission. For example, the network device may provide the information to permit the stall controller to determine whether to delay the transmission of the rate credit update, such as when the transmission capacity of network device 220 is maximized. In some implementations, network device 220 may receive an indication from the stall controller as to whether network device 220 is to stall providing of the rate credit.

In some implementations, network device 220 may provide the rate credit update to client device 230. For example, network device 220 may provide the rate credit update to client device 230 for display. Additionally, or alternatively, network device 220 may generate a report that includes information identifying the rate credit update.

In some implementations, network device 220 may determine a delay value to use when determining whether the threshold amount of time has elapsed. For example, when determining the delay value, network device 220 may receive information associated with a latency variation of external storage device 210 (e.g., based on monitoring latency of external storage device 210, based on information from another network device 220, based on information from client device 230, etc.), and may determine a delay value based on the information (e.g., may determine a delay value that is greater than the latency variation). Additionally, or alternatively, network device 220 may monitor latency variation related to obtaining the set of instructions from external storage device 210 and may adjust/modify the delay value based on changes to the latency variation that network device 220 detected while monitoring the latency variation. This enables network device 220 to dynamically adjust wait time to accommodate unexpected variations in latency, thereby improving providing the rate credit update. Additionally, or alternatively, network device 220 may monitor for another indication from a timer. In other words, block 480 may include returning to block 410.

In this way, network device 220 may provide the rate credit update based on determining whether the threshold amount of time after the time indicated by the timestamp has elapsed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a network device to use a configurable delay when updating rate credits for another device by determining a timestamp for each rate credit update and delaying the rate credit update by a threshold amount of time that exceeds a latency variation for an external storage device storing a set of instructions related to the rate credit update. This permits the network device to update rate credits at a regular interval regardless of latency associated with the external storage device (e.g., due to the network device delaying updates by an amount of time that exceeds the latency variation for the external storage device).

In this way, the network device reduces or eliminates an effect of latency when obtaining a set of instructions related to a rate credit update from an external storage device, thereby improving rate credit updates. Furthermore, in this way, the network device improves performance of the other device by reducing or eliminating jitter of the other device due to latency related to obtaining a set of instructions for a rate credit update from an external storage device. Furthermore, in this way, the network device improves a transmission of data by the other device by reducing or eliminating clipping, and maximizes a transmission capability of the other device, thereby improving a transmission of data and/or reducing idle time of the other device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more processors to:
  receive an indication that a time interval has elapsed,
    the time interval indicating a time at which the first device is to provide a rate credit update to a second device;
  generate a request for a set of instructions based on receiving the indication,
    the set of instructions being associated with the rate credit update;
  provide the request to a third device based on generating the request,
    the third device storing the set of instructions;
  store information associated with the request, and a timestamp of the request, in a first data structure in association with providing the request to the third device;
  receive, from the third device, the set of instructions based on storing the information associated with the request;
  store the set of instructions and the timestamp in a second data structure based on receiving the set of instructions;
  determine whether a threshold amount of time after the time indicated by the timestamp has elapsed based on storing the set of instructions and the timestamp; and
  provide the rate credit update to the second device based on determining whether the threshold amount of time after the time indicated by the timestamp has elapsed.

2. The first device of claim 1, where the one or more processors are further to:
  determine a current time based on receiving the set of instructions;
  determine whether the current time satisfies the timestamp plus a delay value based on determining the current time; and
  where the one or more processors, when determining whether the threshold amount of time has elapsed, are to:
    determine whether the threshold amount of time after the time indicated by the timestamp has elapsed based on determining whether the current time satisfies the timestamp plus the delay value.

3. The first device of claim 2, where the delay value is a value greater than a latency variation associated with the third device.

4. The first device of claim 2, where the one or more processors are further to:
  determine whether a rate limit value is to be applied to the rate credit update based on determining whether the threshold amount of time after the time indicated by the timestamp has elapsed; and
  where the one or more processors, when providing the rate credit update to the second device, are to:
    provide the rate credit update to the second device based on determining whether the rate limit value is to be applied to the rate credit update.

5. The first device of claim 1, where the one or more processors are further to:
  receive, from the third device, another indication that the third device successfully located the set of instructions in memory resources of the third device;
  perform an action related to the information stored in the first data structure based on receiving the other indication; and
  where the one or more processors, when receiving the set of instructions, are to:
    receive the set of instructions in association with performing the action and after receiving the other indication.

6. The first device of claim 1, where the one or more processors are further to:
  decode the set of instructions based on receiving the set of instructions; and
  where the one or more processors, when providing the rate credit update, are to:
    provide the rate credit update based on decoding the set of instructions.

7. The first device of claim 1, where the one or more processors, are further to:
  receive information indicating a value of a latency variation of the third device based on receiving the set of instructions;
  determine a delay value to be used when determining whether the threshold amount of time has elapsed,
    the delay value being greater than the value of the latency variation of the third device; and
  where the one or more processors, when determining whether the threshold amount of time after the time indicated by the timestamp has elapsed, are to:
    determine whether the threshold amount of time after the time indicated by the timestamp has elapsed based on determining the delay value.

8. A non-transitory computer-readable medium storing instructions, the instructions comprising:
  one or more instructions that, when executed by one or more processors of a network device, cause the one or more processors to:
    receive a first indication that a time interval has elapsed,
      the time interval indicating a time associated with requesting a set of instructions from an external storage device, the external storage device being external to the network device;
generate a request for the set of instructions based on receiving the first indication,
   the set of instructions being associated with a rate credit update to be provided to another device,
   the other device being different than the network device or the external storage device;
provide the request to the external storage device based on generating the request,
   the external storage device storing the set of instructions;
store information associated with the request, and a timestamp of the request, in association with providing the request to the external storage device;
receive, from the external storage device, a second indication that the external storage device successfully located the set of instructions after storing the information;
receive, from the external storage device, the set of instructions after receiving the second indication;
store the set of instructions in association with the timestamp based on receiving the set of instructions;
determine whether a threshold amount of time after the time indicated by the timestamp has elapsed based on storing the set of instructions; and
provide the rate credit update to the other device based on determining whether the threshold amount of time after the time indicated by the timestamp has elapsed.

9. The non-transitory computer-readable medium of claim 8, where the one or more instructions, when executed by the one or more processors, further cause the one or more processors to:
determine a current time based on receiving the set of instructions;
determine whether the current time satisfies the timestamp plus a first value based on determining the current time,
   the first value indicating a first delay to be applied to the rate credit update,
   the first value being associated with a latency variation of receiving the set of instructions; and
where the one or more instructions, that cause the one or more processors to determine whether the threshold amount of time has elapsed, cause the one or more processors to:
   determine whether the threshold amount of time after the time indicated by the timestamp has elapsed based on determining whether the current time satisfies the timestamp plus the first value.

10. The non-transitory computer-readable medium of claim 8, where the one or more instructions, when executed by the one or more processors, further cause the one or more processors to:
determine whether a second value is to be applied to the rate credit update based on determining whether the threshold amount of time has elapsed,
   the second value indicating a second delay to be applied to the rate credit update; and
where the one or more instructions, that cause the one or more processors to provide the rate credit update, cause the one or more processors to:
   provide the rate credit update based on determining whether the second value is to be applied to the rate credit update.

11. The non-transitory computer-readable medium of claim 8, where the one or more instructions, when executed by the one or more processors, further cause the one or more processors to:
decode the set of instructions using a data transformer of the network device based on receiving the set of instructions; and
where the one or more instructions, that cause the one or more processors to store the set of instructions, cause the one or more processors to:
   store the set of instructions based on decoding the set of instructions.

12. The non-transitory computer-readable medium of claim 8, where the one or more instructions, when executed by the one or more processors, further cause the one or more processors to:
provide a third indication to a stall controller of the network device that the set of instructions have been received based on receiving the set of instructions; and
receive a fourth indication from the stall controller that indicates whether the network device can provide the rate credit update based on providing the third indication; and
where the one or more instructions, that cause the one or more processors to provide the rate credit update, cause the one or more processors to:
   provide the rate credit update to the other device based on receiving the fourth indication.

13. The non-transitory computer-readable medium of claim 8, where the one or more instructions, when executed by the one or more processors, further cause the one or more processors to:
generate a report associated with the rate credit update based on providing the rate credit update to the other device.

14. The non-transitory computer-readable medium of claim 8, where the request includes a high bandwidth memory (HBM) request.

15. A method, comprising:
receiving, by a first device, one or more indications that one or more time intervals have elapsed,
   the one or more time intervals indicating one or more times at which the first device is to request one or more sets of instructions from one or more second devices,
   the one or more sets of instructions indicating an amount of rate credits to be provided to one or more third devices during one or more rate credit updates associated with the one or more third devices;
generating, by the first device, one or more requests for the one or more sets of instructions based on receiving the one or more indications,
   the one or more requests including use of direct memory access (DMA);
providing, by the first device, the one or more requests to the one or more second devices based on generating the one or more requests,
   the one or more second devices storing the one or more sets of instructions;
storing, by the first device, information associated with the one or more requests, and one or more timestamps of the one or more requests, in association with providing the one or more requests to the one or more second devices;

receiving, by the first device and from the one or more second devices, the one or more sets of instructions based on storing the information associated with the one or more requests;

storing, by the first device, the one or more sets of instructions in association with the one or more timestamps based on receiving the one or more sets of instructions;

determining, by the first device, whether one or more threshold amounts of time after the one or more times indicated by the one or more timestamps have elapsed based on storing the one or more sets of instructions; and providing, by the first device, the one or more rate credit updates to the one or more third devices based on determining whether the one or more threshold amounts of time after the one or more times indicated by the one or more timestamps have elapsed.

16. The method of claim 15, further comprising:

determining whether a current time satisfies the one or more timestamps plus one or more delay values based on receiving the one or more sets of instructions;

determining whether one or more rate limit values are to be applied to the one or more rate credit updates based on determining whether the current time satisfies the one or more timestamps plus the one or more delay values; and where providing the one or more rate credit updates comprises:
  providing the one or more rate credit updates based on determining whether the one or more rate limit values are to be applied to the one or more rate credit updates.

17. The method of claim 16, further comprising:

monitoring for one or more changes to one or more latency variations of the one or more second devices based on receiving the one or more sets of instructions;

modifying the one or more delay values based on monitoring for the one or more changes; and where determining whether the one or more threshold amounts of time have elapsed comprises:
  determining whether the one or more threshold amounts of time after the one or more times indicated by the one or more timestamps have elapsed based on modifying the one or more delay values.

18. The method of claim 15, further comprising:

providing one or more first indications to one or more schedulers of the first device to schedule the one or more rate credit updates for transmission to the one or more third devices based on determining whether the one or more threshold amounts of time after the one or more times indicated by the one or more timestamps have elapsed,
  the one or more first indications indicating whether the one or more threshold amounts of time have elapsed;

receiving, from the one or more schedulers, one or more second indications that the one or more rate credit updates have been scheduled for transmission to the one or more third devices based on providing the one or more first indications; and where providing the one or more rate credit updates comprises:
  providing the one or more rate credit updates based on receiving the one or more second indications.

19. The method of claim 15, further comprising:

providing one or more first indications to one or more stall controllers based on determining whether the one or more threshold amounts of time after the one or more times indicated by the one or more timestamps have elapsed,
  the one or more first indications indicating whether the one or more threshold amounts of time have elapsed;

receiving, from the one or more stall controllers, one or more second indications that the one or more rate credit updates can be provided to the one or more third devices; and where providing the one or more rate credit updates comprises:
  providing the one or more rate credit updates based on receiving the one or more second indications.

20. The method of claim 15, where the rate credit update includes:
  a queue rate update (QRU), or
  a node rate update (NRU).

* * * * *